United States Patent
Collins et al.

(10) Patent No.: US 11,205,800 B2
(45) Date of Patent: Dec. 21, 2021

(54) POLYMER AND MOLTEN ION CONDUCTIVE SALT AND SILICON INTERFACE FOR DECREASED INTERFACIAL RESISTANCE

(71) Applicant: International Business Machines Corporation, Armonk, NY (US)

(72) Inventors: John Collins, Tarrytown, NY (US); Ali Afzali-Ardakani, Ossining, NY (US); Teodor K. Todorov, Yorktown Heights, NY (US); Joel P. de Souza, Putnam Valley, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 16/389,012

(22) Filed: Apr. 19, 2019

(65) Prior Publication Data

US 2020/0335819 A1    Oct. 22, 2020

(51) Int. Cl.
| | |
|---|---|
| H01M 10/0565 | (2010.01) |
| H01M 4/134 | (2010.01) |
| H01M 4/38 | (2006.01) |
| H01M 10/0563 | (2010.01) |
| H01C 1/14 | (2006.01) |
| H01C 17/065 | (2006.01) |
| H01C 7/00 | (2006.01) |
| H01G 9/00 | (2006.01) |
| H01G 9/025 | (2006.01) |
| H01G 9/042 | (2006.01) |

(52) U.S. Cl.
CPC .......... *H01M 10/0565* (2013.01); *H01C 1/14* (2013.01); *H01C 7/005* (2013.01); *H01C 17/065* (2013.01); *H01M 4/134* (2013.01); *H01M 4/386* (2013.01); *H01M 10/0563* (2013.01); *H01G 9/0036* (2013.01); *H01G 9/025* (2013.01); *H01G 9/042* (2013.01); *H01M 2300/002* (2013.01); *H01M 2300/0082* (2013.01)

(58) Field of Classification Search
None
See application file for complete search history.

(56) References Cited

U.S. PATENT DOCUMENTS

| | | |
|---|---|---|
| 10,147,937 B2 | 12/2018 | Nogami et al. |
| 2017/0317382 A1 | 11/2017 | Wang et al. |
| 2017/0331092 A1 | 11/2017 | Chen et al. |
| 2017/0338522 A1 | 11/2017 | Hu et al. |
| 2017/0373304 A1 | 12/2017 | Kim et al. |
| 2018/0138554 A1 | 5/2018 | Mukherjee et al. |
| 2019/0019629 A1 | 1/2019 | Makino et al. |
| 2019/0020059 A1 | 1/2019 | Choi et al. |
| 2021/0167420 A1 | 6/2021 | Zhang |

FOREIGN PATENT DOCUMENTS

| | | | |
|---|---|---|---|
| EP | 3285324 A1 | | 2/2018 |
| JP | 2004-185865 | * | 7/2004 |
| WO | 2017116599 A2 | | 7/2017 |

OTHER PUBLICATIONS

Machine translation of JP 2004-185865, published on Jul. 2, 2004 (Year: 2004).*
Office Action dated Jun. 21, 2021 received in U.S. Appl. No. 16/389,069.
Li, Y., et al., "Hybrid Polymer/Garnet Electrolyte with a Small Interfacial Resistance for Lithium-Ion Batteries", Angew. Chem., First Published: Dec. 9, 2016, pp. 771-774, 129.
Jiang, Y., et al., "Development of the PEO Based Solid Polymer Electrolytes for All-Solid State Lithium Ion Batteries", Polymers, Published Nov. 7, 2018, 13 pages, 10,1237.
U.S. Appl. No. 16/026,461, filed Jul. 3, 2018, entitled: Battery Structure With an Anode Structure Containing a Porous Region and Method of Operation, 51 pages, First Named Inventor: Joel P. de Souza.
Goonetilleke, D., et al., "Insight Into the Formation of Lithium Alloys in All-Solid-State Thin Film Lithium Batteries", Frontiers in Energy Research, Jul. 2018, 10 pages, vol. 6, Article 64.
List of IBM Patents or Patent Applications Treated as Related dated Apr. 19, 2019, 2 pages.

* cited by examiner

*Primary Examiner* — Anca Eoff
(74) *Attorney, Agent, or Firm* — Scully, Scott, Murphy & Presser, P.C.; Daniel P. Morris, Esq.

(57) ABSTRACT

A device such as, for example, an energy storage device or a micro-resistor, is disclosed which includes a silicon based electrode in which decreased interfacial resistance/impedance throughout the charge-mobile region of the device is provided. The decreased interfacial resistance/impedance is provided by forming an interfacial additive composite layer composed of a molten lithium containing salt layer and a layer of a Li-salt containing conductive polymeric adhesive material between the silicon based electrode and a solid polymer electrolyte layer. The presence of such an interfacial additive composite layer increases the ion and electron mobile dependent performances at the silicon based electrode interface due to significant decrease in the resistance/impedance that is observed at the respective interface as well as the impedance observed in the bulk of the device.

20 Claims, 4 Drawing Sheets

(Of the invention)

(Not of the invention)

POLYMER AND MOLTEN ION CONDUCTIVE SALT AND SILICON INTERFACE FOR DECREASED INTERFACIAL RESISTANCE

BACKGROUND

The present application relates to devices containing a silicon based electrode, and more particularly to energy storage devices containing a silicon based electrode and having a decreased interfacial resistance.

The integration of energy storage devices in microprocessors and memory chips is a significant requirement for IoT (internet of things) device applications. Typically, these devices require relatively high energy and power density from miniaturized storage devices embedded in CMOS circuits. Over the next generation, required energy consumption for electronic devices will decrease as human controlled and autonomous devices will increasingly become miniaturized. Power consumption is expected to be well below 1 Watt for these devices.

Emerging applications requiring these on-board generation storage devices include IoT applications, mobile devices, sensory equipment, and autonomous environmental, biological and social functional machines. Common examples of such functional devices are known as smart dust and/or biomedical sensory/drug delivery.

Additionally, all solid-state energy storage devices will progressively integrate a lithium metal electrode material into its overall cell structure due to lithium metal's extremely high theoretical energy density (3860 mAh/g) and therefore its' ability to maintain high capacity throughout the cell's lifetime. A feasible process forming an interfacial-modified silicon based electrode material as a stable nucleation site for the in-situ formation of lithium metal electrodes is disclosed, for example, in U.S. Ser. No. 16/026,461 entitled "Battery Structure with an Anode Structure Containing a Porous Region and Method of Operation", filed on Jul. 3, 2018.

One enormous impediment to making the above need a reality are the methods by which the active and inactive energy storage device components are integrated together—specifically, how these methods affect the cross-linking and adhesion between interfaces which facilitate ion/electron-charge transfer throughout the electrochemical components of the cell. The physical and chemical conditions of how electrochemically active energy storage components are synthesized as well as 'bonded' or 'cross-linked' together determines their performance capabilities within a fully capable and effective energy storage device—especially with regard to the amount of impedance charge particles endure during transport across energy storage device interfaces.

One method to achieve high performing energy storage device components is to administer the synthesis and bonding of energy storage device components during component layer integration (prior to full cell assembly or electrochemical cycling). As the physical and chemical conditions of each component layer is altered, especially in regards to the solid/semi-solid electrolyte, the inter-layer bonding capabilities as well as charge-conductive properties of the respective component layer can be utilized and optimized, respectively, to create a highly material-dependent and efficient solid state/semi-solid state energy storage device that is well bonded to other energy storage device components and therefore illustrates very low interfacial-induced charge-blocking resistance. As such, the independent treatment of each component layer within an electrically and ionically insulated energy storage housing unit can facilitate the fabrication of highly efficient working energy storage devices.

SUMMARY

A device such as, for example, an energy storage device or a micro-resistor, is disclosed which includes a silicon based electrode in which decreased interfacial resistance/impedance throughout the charge-mobile region of the device is provided. The decreased interfacial resistance/impedance is provided by forming an interfacial additive composite layer composed of a molten lithium containing salt layer and a layer of a Li-salt containing conductive polymeric adhesive material between the silicon based electrode and a solid polymer electrolyte layer. By "molten lithium containing salt", it is meant a semi-solid/liquid state of a material. The molten lithium containing salt may also be referred to herein as a molten ion conductive containing salt. The presence of such an interfacial additive composite layer (i.e., molten lithium containing salt layer and layer of Li-salt containing conductive polymeric adhesive material) increases the ion and electron mobile dependent performances at the silicon based electrode interface due to significant decrease in the resistance/impedance that is observed at the respective interface as well as the impedance observed in the bulk of the device.

In one aspect of the present application, a device having a decreased interfacial resistance is provided. In one embodiment, the device includes a silicon based electrode. The device further includes an interfacial additive layer composed of a molten lithium containing salt. The interfacial additive layer has a first surface that forms an interface with a surface of the silicon based electrode. The device even further includes a Li-salt containing conductive polymeric adhesive that forms an interface with a second surface of the interfacial additive layer that is opposite the first surface of the interfacial additive layer. A solid polymer electrolyte layer forms an interface with the Li-salt containing conductive polymeric adhesive.

In some embodiments, the device may further include a second Li-salt containing conductive polymeric adhesive forming an interface with the solid polymer electrolyte layer, a second interfacial additive layer composed of another molten lithium containing salt forming an interface with the second Li-salt containing conductive polymeric adhesive, and a second silicon based electrode forming an interface with the second interfacial additive layer.

In one exemplary embodiment, the device includes a silicon based electrode composed of boron doped crystalline silicon, an interfacial additive layer composed of molten lithium bis(trifluoromethanesulfonyl)imide (LiTFSI) forming an interface with the silicon based electrode, a Li-salt containing conductive polymeric adhesive composed of polyaniline (PANI) and LiTFSI forming an interface with the interfacial additive layer, and a solid polymer electrolyte layer composed of a mixture of polycaprolactone, succinonitrile and LiTFSI forming an interface with the Li-salt containing conductive polymeric adhesive.

In some embodiments, such a device may further include a second Li-salt containing conductive polymeric adhesive composed of PANI and LiTFSI forming an interface with the solid polymer electrolyte layer, a second interfacial additive layer composed of molten lithium LiTFSI forming an interface with the second Li-salt containing conductive polymeric adhesive, and a second silicon based electrode composed of boron doped crystalline silicon forming an interface with the second interfacial additive layer.

In another aspect of the present application, a method of forming a device is provided. In one embodiment of the present application, the method includes depositing a layer of a lithium containing salt on a surface of a silicon based electrode. Next, the layer of the lithium containing salt that is deposited on the silicon based electrode is heated to a temperature that provides a molten lithium containing salt. The molten lithium containing salt is then cooled to provide an interfacial additive layer composed of the molten lithium containing salt. A Li-salt containing conductive polymeric adhesive is then formed on the interfacial additive layer, and a solid polymer electrolyte layer is formed on the Li-salt containing conductive polymeric adhesive.

DETAILED DESCRIPTION

Figure 1:
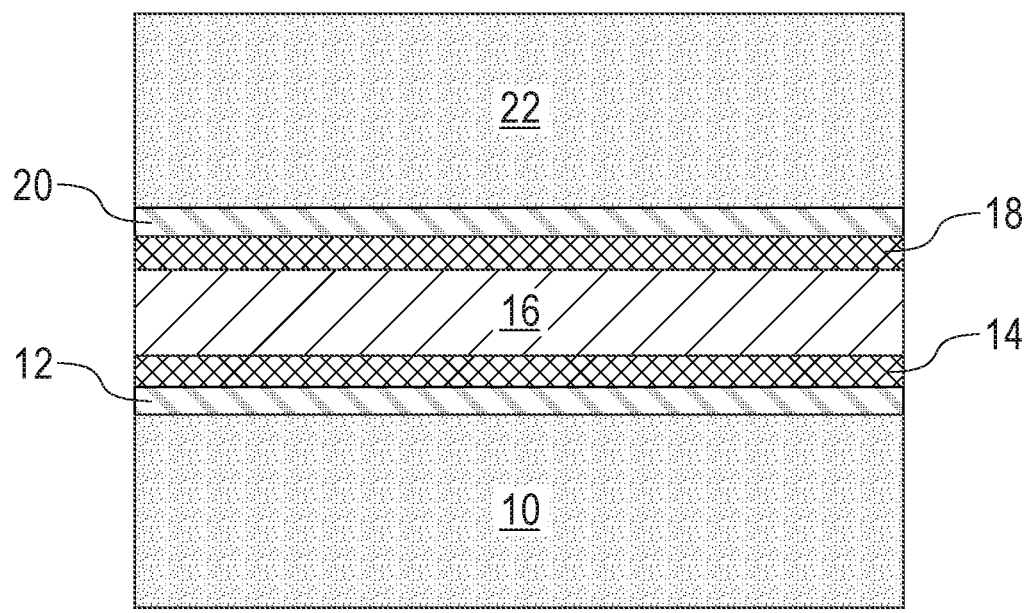
FIG. 1 is a cross sectional view of an exemplary device in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The present application provides devices including energy storage devices and micro-resistors that contain a composite interfacial additive layer that contains an interfacial additive layer of a molten lithium containing salt layer and a Li-salt containing conductive polymeric adhesive layer which is located between the silicon based electrode and a solid polymer electrolyte layer. The presence of such a composite interfacial additive layer between the silicon based electrode and the solid polymer electrolyte layer decreases the interfacial resistance/impedance of the device compared to a like device in which the composite interfacial additive layer is omitted. The presence of the molten lithium containing salt interfacial additive component layer and the component layer of Li-salt containing conductive polymeric adhesive (i.e., the composite interfacial additive layer) increases the ion and electron mobile dependent performances (e.g., increased conductivity and rate of charge particle mobility) at the silicon based electrode interface due to a significant decrease in the resistance/impedance that is observed at the respective interface as well as the impedance observed in the bulk of the device.

Reference is now made to FIG. 1, which illustrates an exemplary device in accordance with an embodiment of the present application. The exemplary device includes a silicon based electrode 10, and an interfacial additive layer 12 composed of a molten lithium containing salt. The molten lithium salt containing interfacial additive layer 12 has a first surface that forms an interface with a surface of the silicon based electrode 10. The device even further includes a Li-salt containing conductive polymeric adhesive 14 that forms an interface with a second surface of the interfacial additive layer 12 that is opposite the first surface of the interfacial additive layer 12, and a solid polymer electrolyte layer 16 that forms an interface with the Li-salt containing conductive polymeric adhesive 14. Collectively, the interfacial additive layer 12 and the Li-salt containing conductive polymeric adhesive 14 provide a composite interfacial additive layer (12/14) of the present application. In some embodiments, the device may further include a counter electrode 22 located above the solid electrolyte polymer layer 16. In some embodiments, a second Li-salt containing conductive polymeric adhesive 18 and a second interfacial additive layer 20 can be formed between the counter electrode 22 and the solid polymer electrolyte layer 16. Collectively, the second Li-salt containing conductive polymeric adhesive 18 and the second interfacial additive layer 20 form another composite interfacial additive layer of the present application. In some embodiments, the second Li-salt containing conductive polymeric adhesive 18 and/or the second interfacial additive layer 20 is/are omitted. When present, the second Li-salt containing conductive polymeric adhesive 18 has a first surface that forms an interface with solid polymer electrolyte layer 16, and a second surface that forms an interface with the second interfacial additive layer 20. The second interfacial additive layer 20 forms an interface with the counter electrode 22.

Figure 2:
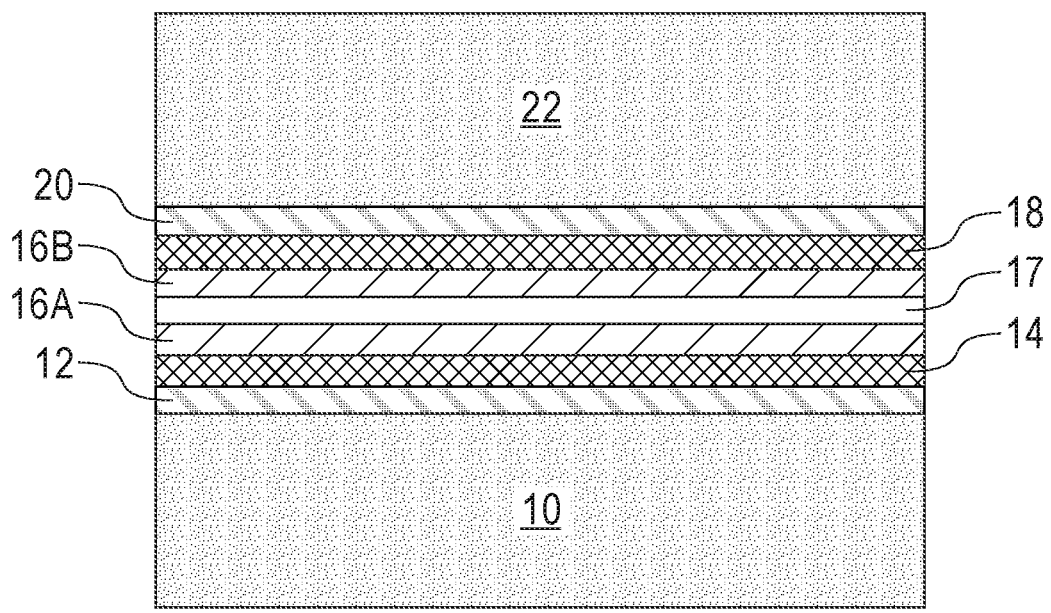
FIG. 2 is a cross sectional view of another exemplary device in accordance with another embodiment of the present application.

FIG. 2 illustrates another exemplary device in accordance with the present application which is identical to the device shown in FIG. 1 except that a separator (or dielectric region) 17 is located between a lower region 16A of the solid polymer electrolyte layer and an upper region 16B of the solid polymer electrolyte layer.

Although not shown in FIGS. 1 and 2, the silicon based electrode 10 is typically present on a surface of a base substrate. If present, the base substrate may include any conventional material that is used as an electrically conductive substrate for an energy storage device. Examples of such a substrate may include, but are not limited to, copper, aluminum, nickel, titanium or respective alloys thereof. The substrate may be mechanically or chemically attached, adhered or bonded with the silicon based electrode 10. In one embodiment, the base substrate may include a semiconductor material and/or any other material having semiconductor properties. In one embodiment, the base substrate is a bulk semiconductor substrate. By "bulk" it is meant that the base substrate is entirely composed of at least one semiconductor material. In one example, the base substrate may be entirely composed of silicon which may be single crystalline. In some embodiments, the bulk semiconductor substrate may include a multilayered semiconductor material stack including at least two different semiconductor materials. In one example, the multilayered semiconductor material stack may comprise, in any order, a stack of Si and a silicon germanium alloy. In another embodiment, the multilayered semiconductor material may comprise, in any order, a stack of Si and single or multiple silicon-based alloys, such as silicon-germanium or carbon-doped silicon-based alloys.

In some embodiments, the base substrate may have a non-textured (flat or planar) surface. The term "non-textured surface" denotes a surface that is smooth and has a surface roughness on the order of less than 100 nm root mean square as measured by profilometry or Atomic Force Microscopy. In yet another embodiment, the base substrate may have a textured surface. In such an embodiment, the surface roughness of the textured substrate can be in a range from 100 nm root mean square to 100 µm root mean square as also measured by profilometry or Atomic Force Microscopy. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the base substrate is composed of a plurality of high surface area 3-dimensional features. In some embodiments, a plurality of metallic masks are used, which may be formed by depositing a layer of a metallic material and then performing an anneal. During the anneal, the layer of metallic material melts and balls-ups such that de-wetting of the surface of the base substrate occurs.

In some embodiments (not shown), a current collector is formed contacting a bottommost surface of silicon based electrode 10. This current collector may be referred to as a first current collector. The first current collector may include any conductive metal or conductive metal nitride such as, for example, titanium (Ti), platinum (Pt), nickel (Ni), aluminum (Al) or titanium nitride (TiN). The current collector may include a single layer of a conductive metal or conductive metal nitride, or a material stack including at least two different conductive metals and/or conductive metal nitrides. In one example, the first current collector can include a stack of, from bottom to top, titanium (Ti), platinum (Pt) and titanium (Ti). The first current collector can be formed utilizing deposition techniques well known to those skilled in the art.

The silicon based electrode 10 has a first polarity, while the counter electrode 22 has a second polarity that is opposite from the first polarity. In some embodiments of the present application, the silicon based electrode 10 may be an anode electrode, while the counter electrode 22 is a cathode electrode. In other embodiments of the present application, the silicon based electrode 10 may be a cathode electrode, while the counter electrode 22 is an anode electrode.

In accordance with the present application, the silicon based electrode 10 is composed of a silicon-containing material. The term "silicon-containing material" is used throughout the present application to denote a material that includes at least silicon and has semiconductor material properties. Examples of silicon-containing materials that made can be employed as the silicon based electrode 10 include silicon (Si), a silicon germanium alloy, or a carbon-doped silicon based alloy. Typically, the silicon based electrode 10 is composed entirely of silicon (Si).

The silicon-containing materials that provide the silicon based electrode 10 can be non-crystalline semiconductor materials or crystalline semiconductor materials. The silicon based electrode 10 may be entirely non-porous, entirely porous or contain some regions that are non-porous and other regions that are porous. The silicon containing materials may be non-doped, doped or contain some regions that are doped and other regions that are non-doped. The dopant can be a p-type dopant or an n-type dopant.

The term "p-type" refers to the addition of impurities to an intrinsic semiconductor that creates deficiencies of valence electrons. In a silicon-containing semiconductor material, examples of p-type dopants, i.e., impurities, include, but are not limited to, boron, aluminum, gallium and indium. The concentration of p-type dopant within the silicon-containing material that provides silicon based electrode 10 can range from 1E16 atoms/cm$^3$ to 3E20 atoms/cm$^3$.

The term "n-type" refers to the addition of impurities that contributes free electrons to an intrinsic semiconductor. In a silicon containing semiconductor material, examples of n-type dopants, i.e., impurities, include, but are not limited to, antimony, arsenic and phosphorous. The concentration of n-type dopant within the silicon-containing material that provides silicon based electrode 10 can range from 1E16 atoms/cm$^3$ to 1E21 atoms/cm$^3$.

Illustrative examples of silicon-containing materials that can used as the silicon based electrode 10 include non-porous silicon, partially porous crystalline silicon, single-crystal non-porous silicon, crystalline silicon, a low resistance doped crystalline silicon (to be defined herein below), boron doped crystalline silicon or boron doped crystalline porous silicon. In one embodiment, boron doped crystalline silicon having a boron dopant concentration of from 1E19 atoms/cm$^3$ to 3E20 atoms/cm$^3$ is used as the silicon-containing material that provides the silicon based electrode 10.

The term "low resistance doped crystalline silicon" denotes a silicon based electrode 10 that is of unitary construction (i.e., a monolith structure) and includes a non-porous region and a porous region, as defined in U.S. Ser. No. 16/026,461 entitled "Battery Structure with an Anode Structure Containing a Porous Region and Method of Operation", filed on Jul. 3, 2018, the entire content and disclosure of which is incorporated herein by reference.

The porous region comprises a top porous layer (Porous Region 1) having a first thickness and a first porosity, and a bottom porous layer (Porous Region 2) having a second porosity that is greater than the first porosity and a second thickness that is greater than the first thickness. The bottom porous layer (i.e., Porous Region 2) is located beneath the top porous layer (i.e., Porous Region 1) and forms an interface with the non-porous region. Also, at least an upper portion of the non-porous region and the entirety of the porous region are composed of silicon. In one embodiment, the second porosity has an average pore opening of greater than 3 nm, and the second thickness is between 0.1 µm to 20 µm, while the first porosity has an average pore opening of less than 3 nm, and the first thickness is 50 nm or less.

As mentioned above, Porous Region 1, Porous Region 2 and the non-porous region are of unitary construction. Thus, non-porous region and porous Regions 1 and 2 are electrically, chemically and mechanically part of a same electrode structure. In some embodiments, the Porous Region 1, Porous Region 2 and the non-porous region are entirely composed of silicon. In one example, the electrode base structure 10 including the non-porous region and porous Regions 1 and 2 has a three-dimensional (3D) lattice framework composed of a p-type crystalline silicon material.

The low resistance doped crystalline silicon that can be used as the silicon based electrode 10 can be made using an anodization process in which a substrate including at least an upper region of a p-type silicon material is immersed into a solution of concentrated HF (49%) while an electrical current is applied with platinum as the anode and the substrate as the cathode. The anodization process is performed utilizing a constant current source that operates at a current density from 0.05 mA/cm$^2$ to 150 mA/cm$^2$, wherein mA is milli-Amperes. In some examples, the current density is 1 mA/cm$^2$, 2 mA/cm$^2$, 5 mA/cm$^2$, 50 mA/cm$^2$, or 100 mA/cm$^2$. In a preferred embodiment, the current density is from 1 mA/cm$^2$ to 10 mA/cm$^2$. The current density may be applied for 1 second to 5 hrs. In some examples, the current density may be applied for 5 seconds, 30 seconds, 20 minutes, 1 hour, of 3 hours. In an embodiment, the current density may be applied for 10 seconds to 1200 seconds, specifically for the doping level in the range $10^{19}$ cm$^3$ range. The anodization process is typically performed at nominal room temperature from (20° C.) to 30° C.) or at a temperature that is slightly elevated from room temperature. Following the anodization process, the structure is typically rinsed with deionized water and then dried.

The interfacial additive layer 12 composed of a molten lithium containing salt is then formed on a surface of the silicon based electrode 10 such that a first surface of the interfacial additive layer 12 forms an interface with a surface of the silicon based electrode 10. The molten lithium containing salt that provides the interfacial additive layer 12 is composed of at least one of the following lithium containing salts: lithium hexafluorophosphate, lithium perchlorate, lithium trifluoromethanesulfonate, lithium fluoride, LiBF$_4$, lithium chloride, lithium phosphate compounds, lithium bromide compounds, lithium bis(trifluoromethanesulfonyl) imide (LiTFSI), lithium difluoro(oxalato)borate (LiDFOB), or lithium bis(oxalato)borate(LiBOB). In one exemplary embodiment, the interfacial additive layer 12 is composed of bis(trifluoromethanesulfonyl)imide (LiTFSI) which is formed on a surface of a base silicon electrode 10 that is composed of boron doped crystalline silicon (boron concentration of about 1×10$^{19}$ atoms/cm$^3$).

The interfacial additive layer 12 can be formed by depositing a layer of a lithium containing salt on a surface of a silicon based electrode 10. The layer of lithium containing salt is non-molten at this point of the present application. The depositing of the layer of the lithium containing salt may include any conventional deposition technique such as, for example, drop coating and then using a doctor blade to provide a homogeneous and uniform layer of the lithium containing salt on the surface of the silicon based electrode 10. Next, the layer of the lithium containing salt that is deposited on the silicon based electrode 10 is heated to a temperature that provides a molten lithium containing salt. In some embodiments of the present application, the heating can be performed at a temperature of greater than 350° C. to provide molten lithium ions. The heating can be performed in an inert ambient such as, for example, helium (He), neon (Ne), argon (Ar) and/or nitrogen (N$_2$). In one example, heating is performed at 410° C. in a nitrogen glove box. The molten lithium containing salt is then cooled to provide interfacial additive layer 12 composed of the molten lithium containing salt. Cooling is performed from the heating temperature to nominal room temperature which can be in a range from 15° C. to 25° C., or below. The interfacial additive layer 12 is a continuous layer that forms an interface with a surface of silicon based electrode 10. The interfacial additive layer 12 can have a thickness from 1 nm to 50 nm. Other thicknesses can be used as the thickness of the interfacial additive layer 12.

The Li-salt containing conductive polymeric adhesive 14 is then formed on a second surface of the interfacial additive layer 12 that is opposite the first surface of the interfacial additive layer 12 that forms an interface with the silicon based electrode 10. The Li-salt containing conductive polymeric adhesive 14 is composed of any polymeric adhesive material that can conduct lithium ions. Illustrative examples of such polymeric adhesive materials that can be used as the Li-salt containing conductive polymeric adhesive 14 include, but are not limited to, polypyrrol (Ppy), polythiophene, polyaniline (PANI), polyphenylene sulfide, Ppy/carbon nanotube composites, poly(3-(potassium-4-butanoate) thiophene) (PPBT) and poly(ethylene glycol) (PEG) composites, and polystyrene sulfonate and carbon (e.g., CNT) composites. In one exemplary embodiment, and when the base silicon electrode 10 is composed of boron doped crystalline silicon, and the interfacial additive layer 12 is composed of bis(trifluoromethanesulfonyl)imide (LiTFSI), the Li-salt containing conductive polymeric adhesive 12 is composed of polyaniline (PANI).

The Li-salt containing conductive polymeric adhesive further includes one of the lithium containing salts mentioned above. In one embodiment, a mixture of PANI and bis(trifluoromethanesulfonyl)imide (LiTFSI) is employed as the Li-salt containing conductive polymeric adhesive 14.

The Li-salt containing conductive polymeric adhesive 14 is a continuous layer that is formed on a surface of the interfacial additive layer 12. The Li-salt containing conductive polymeric adhesive 14 can have a thickness from 20 nm to 500 nm; although other thicknesses are possible and can be used as the thickness of the Li-salt containing conductive polymeric adhesive 14. The Li-salt containing conductive polymeric adhesive 14 can be formed utilizing a deposition process such as solution deposition, pipetting, drop casting, spin coating, doctor-blade coating, spray casting, followed by controlled temperature and pressure conditions.

The solid polymer electrolyte layer 16 is then formed on the Li-salt containing conductive polymeric adhesive 14. In the embodiment shown in FIG. 1, the solid polymer electrolyte layer 16 is continuous from a bottommost surface to a topmost surface.

The solid polymer electrolyte layer 16 that can be used in the present application is any solid polymer material that can conduct Li ions. In one embodiment, the solid polymer electrolyte layer 16 is composed of a mixture of a polymer structure host material, a Li-conductive/plasticizing material and a lithium containing salt. In such an embodiment, the mixture includes from 35 weight percent to 50 weight percent of the polymer structure host material, from 15 weight percent to 25 weight percent of the conductive/ plasticizing material, and from 30 weight percent to 45 weight percent of the lithium containing salt, where the polymer host material and conductive/plasticizing material are dissolved into anhydrous acetonitrile with a solid:solvent ratio between 1:2 to 1:10, with a preferred ratio of 1:3. The mixture can be made utilizing techniques well known to those skilled in the art.

Illustrative examples of polymer structure host materials include at least one of poly(ethylene oxide) (PEO), poly (propylene oxide) (PPO), poly(dimethylsiloxane), poly(vinyl chloride), or polycaprolactone. Illustrative examples of Li-conductive/plasticizing material include at least one of succinonitrile, poly(ethylene glycol) (PEG), an aprotic organic solvent, or dimethylsulfoxide (DMSO). Illustrative lithium containing salts that can be used in forming the solid polymer electrolyte layer include, but are not limited to, lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB). The lithium containing salt that is present in the solid polymer electrolyte layer 14 can be the same as, or different from, the lithium containing salt that is used in providing the interfacial additive layer 12 defined above. Typically, the lithium containing salt used in the solid polymer electrolyte layer 16 is the same as that used for the interfacial additive layer 12 and the Li-salt containing conductive polymeric adhesive 14.

In the embodiment illustrated in FIG. 2, the solid polymer electrolyte layer has a lower region 16A and an upper region 16B, and a separator (or dielectric region) 17 is present between the lower region and the upper region. The separator 17 can be composed of at least one of polyacrylnitrile (PAN), polyethylene oxide (PEO) based copolymer matrices or structural membranes, a quarternized polysulfone membrane, electrospun polyvinylidene fluoride, or a methylmethacrylate (MMA)/polyethylene (PE) composite.

In some embodiments, the solid polymer electrolyte layer 16 is composed of a garnet/polymer electrolyte composite (e.g., $Li_{6.5}La_3Zr_{1.5}Ta_{0.5}O_{12}$/PEO composites) which acts as both a solid polymer electrolyte and separator in one.

The solid polymer electrolyte layer 16 may be formed utilizing a deposition process such as, drop casting, pipette casting, blade coating, spin coating, spray coating, etc. followed by controlled temperature and pressure conditions or plating. In one embodiment, the solid-state electrolyte is formed by sputtering utilizing any conventional target source material in conjunction with reactive or inert gasses. For example, sputtering may be performed in the presence of at least a nitrogen-containing ambient. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 50% to 100%, with a nitrogen content within the ambient from 99.9% to 100% being more typical.

As mentioned above, a second Li-salt containing conductive polymeric adhesive 18 and a second interfacial additive layer 20 can be formed above the solid polymer electrolyte layer 16. In some embodiments, the second Li-salt containing conductive polymeric adhesive 18 and/or the second interfacial additive layer 20 is/are omitted. When both the second Li-salt containing conductive polymeric adhesive 18 and the second interfacial additive layer 20 are present, the second Li-salt containing conductive polymeric adhesive 18 has a first surface that forms an interface with the solid polymer electrolyte layer 16, and a second surface, opposite the first surface, that forms an interface with the second interfacial additive layer 20. The second Li-salt containing conductive polymeric adhesive 18 may have a thickness from 20 nm to 500 nm, and the second interfacial additive layer 16 may have a thickness from 1 nm to 100 nm, with a preferred embodiment of less than 50 nm; with an even more preferred embodiment of less than 25 nm.

The second Li-salt containing conductive polymeric adhesive 18 may include one of the conductive polymeric materials and one of the lithium containing salts mentioned above for the Li-salt containing conductive polymeric adhesive 14. In one embodiment, the second Li-salt containing conductive polymeric adhesive 18 is composed of a Li-salt containing conductive polymeric adhesive that is compositionally the same as the Li-salt containing conductive polymeric adhesive that provides the Li-salt containing conductive polymeric adhesive 14. In one example, the Li-salt containing conductive polymeric adhesive 14 and the second Li-salt containing conductive polymeric adhesive 18 are both composed of PANI that is admixed with lithium bis (trifluoromethanesulfonyl)imide (LiTFSI). In one embodiment, the second Li-salt containing conductive polymeric adhesive 18 is composed of a Li-salt containing conductive polymeric adhesive that is compositionally different from the Li-salt containing conductive polymeric adhesive that provides the Li-salt containing conductive polymeric adhesive 14. In one embodiment, the Li-salt containing conductive polymeric adhesive 14 is composed of PANI admixed with lithium bis(trifluoromethanesulfonyl)imide (LiTFSI), and the second Li-salt containing conductive polymeric adhesive 18 is composed of Ppy or polythiopene admixed with lithium bis(trifluoromethanesulfonyl)imide (LiTFSI). The second Li-salt containing conductive polymeric adhesive 18 can be formed utilizing one of the deposition processes mentioned above for forming the Li-salt containing conductive polymeric adhesive 14.

The second interfacial additive layer 20 is then formed either on a physically exposed surface of the second Li-salt containing conductive polymeric adhesive 18 or on a physically exposed surface of the solid polymer electrolyte layer 16. In some embodiments (typically used when the counter electrode 22 is composed of a silicon-containing material as defined above for the silicon based electrode 10), the second interfacial additive layer 20 is composed of another molten lithium containing salt. The another molten lithium containing salt that can provide the second interfacial additive layer 20 may include one of the molten lithium contains salts mentioned above for the interfacial additive layer 12. In one embodiment, the another molten lithium containing salt that can provide the second interfacial additive layer 20 is compositionally the same as the molten lithium containing salt that provides the interfacial additive layer 12. In another embodiment, the another molten lithium containing salt that can provide the second interfacial additive layer 20 is compositionally different from the molten lithium containing salt that provides the interfacial additive layer 12. In one embodiment, the interfacial additive layer 12 and the second interfacial additive layer 20 are both composed of lithium bis(trifluoromethanesulfonyl)imide (LiTFSI). In such an embodiment, the Li-salt containing conductive polymeric adhesive 14 and the second Li-salt containing conductive polymeric adhesive 18 may be both composed of PANI that is admixed with lithium bis(trifluoromethanesulfonyl)imide (LiTFSI).

In the embodiments in which the second interfacial additive layer 20 is composed of another molten lithium containing salt, the second interfacial additive layer 20 is formed utilizing the process mentioned above for forming the interfacial additive layer 12.

In some embodiments (typically used when the counter electrode 22 is composed of a cathode material or anode material as defined herein below), the second interfacial additive layer 20 is composed of an interfacial additive material such as, for example, a carbon (C) based material, gold (Au) or a dielectric material oxide such as, for example, aluminum oxide. The interfacial additive material that can provide the second interfacial additive layer 20 may be a mixture with any combination of electrically insulating as well as Li-ion ionic-conducting components, such as but not limited to $LiNbO_3$, $LiZrO_2$, $Li_4SiO_4$, or $Li_3PO_4$. The interfacial additive material that can provide the second interfacial additive layer 16 may be formed utilizing a deposition process including, for example, chemical vapor deposition, plasma enhanced chemical vapor deposition, evaporation, electrochemical plating, or atomic layer deposition.

The counter electrode 22, which is typically a lithium hosting electrode, can be anode electrode or a cathode electrode. In embodiments in which the silicon based electrode 10 is an anode electrode, the counter electrode 22 is a cathode electrode. In such an embodiment, the cathode electrode (i.e., counter electrode 22) may include a second silicon based electrode. The second silicon based electrode may be compositionally the same as, or compositionally different from the silicon based electrode 10. The second silicon based electrode can include non-porous silicon, partially porous crystalline silicon, single-crystal non-porous silicon, crystalline silicon, a low resistance doped crystalline silicon, boron doped crystalline silicon or boron doped crystalline porous silicon.

In some embodiment, the cathode electrode (i.e., counter electrode 22) includes a lithium-containing cathode material. The lithium-containing cathode material may include a lithium-containing material such as, for example, a lithium-based mixed oxide. Examples of lithium-based mixed oxides that may be employed as the lithium-containing cathode material include, but are not limited to, lithium cobalt oxide ($LiCoO_2$), lithium nickel oxide ($LiNiO_2$), lithium manganese oxide ($LiMn_2O_4$), lithium manganese oxyfluoride ($Li_2MnO_2F$), lithium vanadium pentoxide ($LiV_2O_5$), lithium nickel manganese cobalt (NMC), nickel cobalt aluminum oxide (NCA), any combination of sulfur-based materials with lithium and other structure supporting elements such as iron, or lithium iron phosphate ($LiFePO_4$).

In some embodiments, a layer of the lithium-containing cathode material may be formed utilizing a deposition process such as, sputtering, slurry casting or plating. In one embodiment, a layer of the lithium-containing cathode material is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof in conjunction with oxygen.

In some embodiments, the layer of lithium-containing cathode material may be formed by slurry casting, which may contain a mixture of electrochemically active [cathode materials, electron-conducting materials (e.g., carbon-based materials)] and inactive (binder materials) components. The thickness of such layers could range from 5 μm to 500 μm. These slurries may also have an electrolyte component in the mixture, along with a lithium based salt(s).

In embodiments in which the silicon based electrode 10 is a cathode electrode, the counter electrode 22 is an anode electrode. In such an embodiment, the anode electrode (i.e., counter electrode 22) may include a second silicon based electrode. The second silicon based electrode may be compositionally the same as, or compositionally different from the silicon based electrode 10. The second silicon based electrode can include non-porous silicon, partially porous crystalline silicon, single-crystal non-porous silicon, crystalline silicon, a low resistance doped crystalline silicon, boron doped crystalline silicon or boron doped crystalline porous silicon.

In some embodiment, the anode electrode (i.e., counter electrode 22) includes a lithium ion generator material or lithium intercalation active material. Examples of materials that may be used as the anode electrode include, but are not limited to, lithium metal, a lithium-base alloy such as, for example, $Li_xSi$, pre-lithiated carbon based material, pre-lithiated silicon based material or a lithium-based mixed oxide such as, for example, lithium titanium oxide ($Li_2TiO_3$). The anode electrode can be formed utilizing deposition techniques that are well known to those skilled in the art. In some embodiments, the anode electrode can be formed by sputtering.

Although not shown, a current collector may be formed atop the counter electrode 22 shown in FIGS. 1 and 2. The current collector that is formed atop the counter electrode 22 may be referred to as a second current collector. The second current collector may include one of the conductive materials mentioned above for the first current collector. In some embodiments, the second current collector is composed of a compositionally same conductive material (i.e., metal or metal nitride) or conductive material stack as the first current collector. In other embodiments, the second current collector is composed of a compositionally different conductive material (i.e., metal or metal nitride) or conductive material stack than the first current collector. The second current collector can be formed utilizing techniques well known to those skilled in the art.

In the present application, the inventive device has an interfacial area between the silicon based electrode and the composite interfacial additive layer and the electrolyte that can have a charge resistance of less than 10 ohms/cm$^2$, the interfacial area and bulk regions of the solid polymer electrolyte layer can have a mass transport resistance of less than 33 ohm/cm$^2$, and wherein a mass transfer/charge transfer resistance ratio is less than, or equal to, 3.5. These values will become more apparent from the discussion provided herein below for FIGS. 4A and 4B of the present application.

Figure 3:
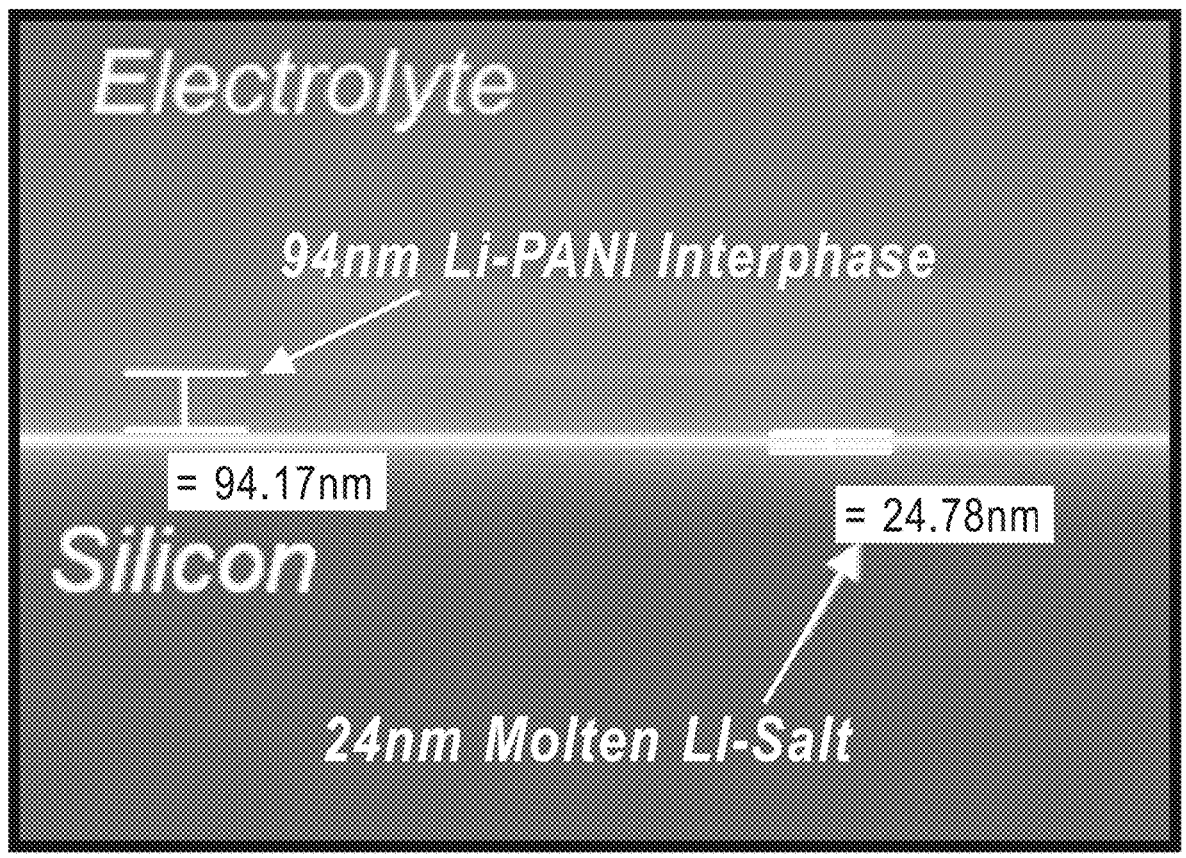
FIG. 3 is a scanning electron micrograph (SEM) of an exemplary device in accordance with the present application.

Reference is now made to FIG. 3, which is a cross sectional scanning electron micrograph (SEM) of an exemplary device in accordance with the present application. In this example, the silicon based electrode 10 was composed of boron doped crystalline silicon, the interfacial additive layer 12 was composed of molten bis(trifluoromethanesulfonyl)imide (LiTFSI), the Li-salt containing conductive polymeric adhesive 14 was composed of PANI admixed with LiTFSI, and the solid polymer electrolyte layer 16 was composed of a mixture of polycaprolactone, succinonitrile and LiTFSI.

As is shown in FIG. 3, an interphase region is located between the solid polymer electrolyte layer 16 and the molten LiTFSI layer where the interphase region is composed of-primarily Li-salt containing conductive polymeric adhesive (LiTFSI-Containing PANI) 14. The interphase region is a region that includes a mixed composition of the Li-salt containing conductive polymeric adhesive 14 and the interfacial additive layer 12 and the solid polymer electrolyte 16. In one example, the interphase region is composed of Li-PANI. The interphase region can form any time after cell assembly, during the operation of the cell or charging/discharging of the device.

As described in more detail below, the composite interfacial additive layer 12, 14 of the present application has its' electrochemical impedance impact modeled by in-situ Electrochemical Impedance Spectroscopy (EIS) measurements which show a reduction in interfacial impedance between the silicon based electrode 10 and the solid polymer electrolyte (SPE) layer 16 when the inventive interfacial additive layer is a mixture of two additive components, composed of both: 1) a molten lithium containing salt, e.g., LiTFSI salt, 12, and 2) a Li-salt containing polymeric adhesive, e.g., LiTFSI-containing PANI, 14 is utilized in a layered/composite fashion.

In the following examples, a single symmetric cell (Cell 1) not in accordance with the present invention was compared to a single symmetric cell (Cell 2) in accordance with the present application. The single symmetric cell (Cell 1) that is not in accordance with the present application, corresponding with the FIGS. 5A and 5B, included a boron doped crystalline silicon electrode/a solid polymer electrolyte layer of polycaprolactone, succinonitrile and bis(trifluoromethanesulfonyl)imide (LiTFSI) containing a polyacrylonitrile (PAN)-based separator/another boron doped crystalline silicon electrode.

Figure 4A:
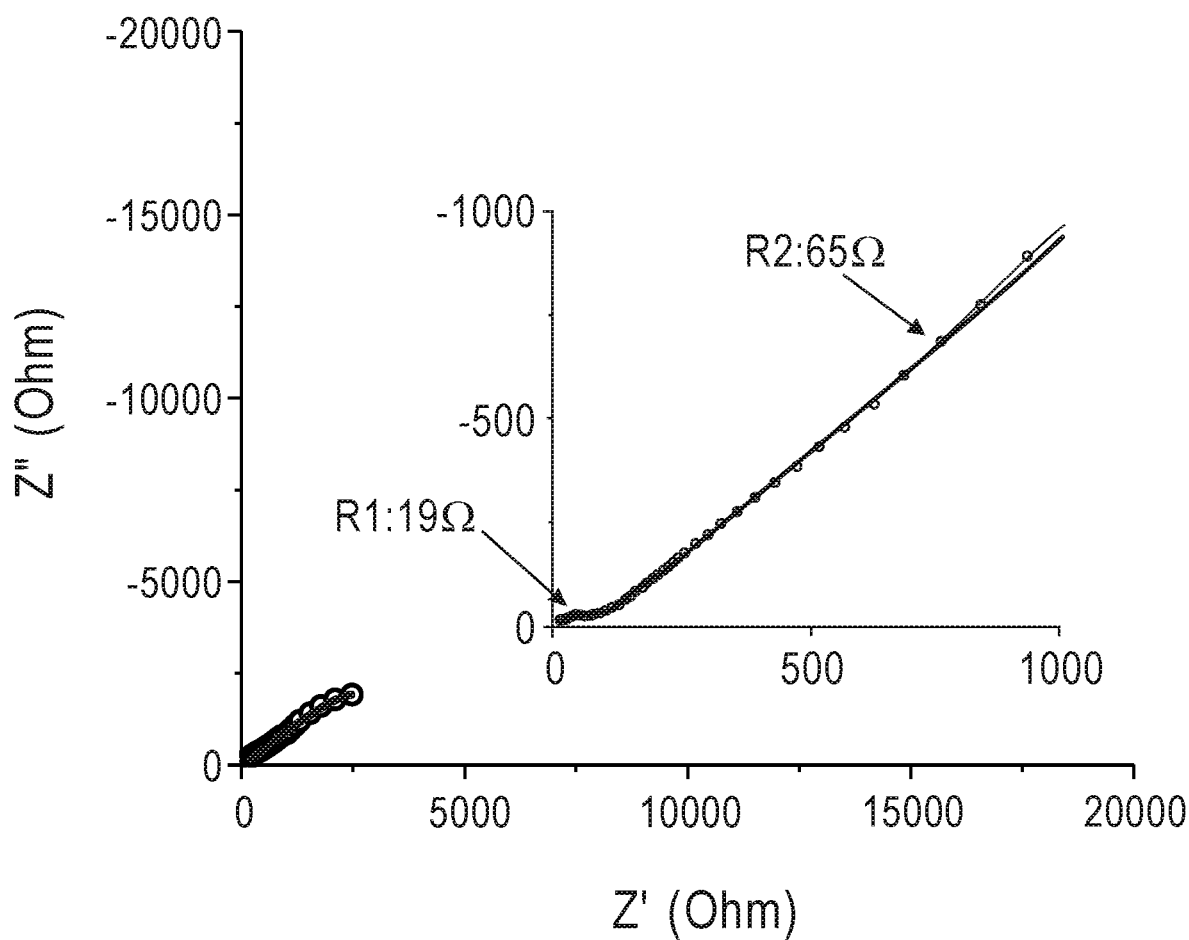
FIG. 4A is graph plotting real part of impedance, Z' in ohms (Ω) vs. imaginary part of impedance, Z" in ohms (Ω) for a device in accordance with the present application.
Figure 4B:
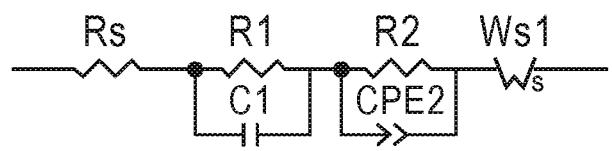
FIG. 4B is the resistor-capacitor model used to fit experimental data and obtain impedance values from the data shown in FIG. 4A.

The single symmetric cell (Cell 2) in accordance with the present application, corresponding to FIGS. 4A and 4B, includes a boron doped crystalline silicon electrode/an interfacial additive layer of molten bis(trifluoromethanesulfonyl)imide (LiTFSI)/a Li-salt containing conductive polymeric adhesive composed of PANI and LiTFSI/a solid polymer electrolyte layer of a mixture of polycaprolactone, succinonitrile and bis(trifluoromethanesulfonyl)imide (LiTFSI) with a polyacrylonitrile (PAN)-based separator/another Li-salt containing conductive polymeric adhesive composed of PANI and LiTFSI/another interfacial additive layer of molten bis(trifluoromethanesulfonyl)imide (LiTFSI)/another boron doped crystalline silicon electrode.

A Nyquist plot is a graph used in Electrochemical Impedance Spectroscopy (EIS) that plots the real part of a battery impedance (associated with real cell resistance) on the X-axis and the imaginary part (associated with cell capacitance) of the battery impedance on the Y-axis over a range of frequencies, e.g., each data point (typically) on the Nyquist plot is one given frequency. The lower frequencies are on the right side of the graph (X-axis) and higher frequencies are on the left (of the X-axis) and the Y-axis shows negative values representing the imaginary part of the impedance.

Generally, in EIS analysis, $R_s$ is measured/estimated as the real part of the impedance at the higher or highest frequency data point of the Nyquist plot. $R_s$ is a pure resistive component denoted as ohmic or series type resistance, between the electrodes of the battery and can often be associated with contact resistance of the cell. Generally, resistor components refer to resistor like elements in the electrochemical model makeup of the cell; capacitor elements refer to an impedance component of the cell which has a phase change (towards −90 degrees) in its' AC current response with respect to frequency—an EIS element with a high degree of capacitance character (e.g., a "C" element) illustrates a surface often associated with unintimate contact (delaminated layers); constant phase elements (CPE) are elements in cell impedance which can maintain a constant phase of AC current response over a given frequency range (often associated with transition layers grown or established in-situ). Generally, in EIS analysis of cells with high performing ion diffusion, electrode/electrolyte interface ion transport processes and/or mass transport (electrolyte migration) associated with the electrolyte, the Warburg impedance measurement frequency component of the cell ($W_{s1}$) is observed as a near 45 degree "straight, diagonal" section of the Nyquist plot.

The large Nyquist plot in FIG. 4A shows the impedance plots for Cell 2 described above. The "circle" points on each curve are actual measured values at a given frequency and the solid line is the calculated values from a best fit RC model, respectively. The smaller Nyquist plot included as an inset in FIG. 4A illustrates a magnified illustration of the high to mid frequency of the large Nyquist plot for Cell 2 described above.

FIG. 4B is a diagram of an RC model for Cell 2 described above. The model comprises a series or ohmic associated resistance, $R_s$; in series with a parallel combination of a resistor, R1 and capacitor element, C1, associated impedance; in series with a parallel combination of resistor, R2 and a constant phase element which is thought to represent the both the interface and bulk composition of the solid polymer electrolyte; in series with a "Warburg impedance, $W_{s1}$.

The frequency measurements varied from 1 megahertz to 200 millihertz; utilizing a potential amplitude of 50 mV.

The parallel combination of a resistor, R1 and capacitor element (C1) is thought to be the electrical model of the active silicon region and associated interface(s). R1 is a pure resistive element while impedance, C1 (Capacitor element) is a capacitor associated imaginary component. This parallel combination is attributed to the combined silicon/composite additive interfacial layer (i.e., molten LiTFSI and LiTFSI containing PANI/solid polymer electrolyte (SPE) interfacial region(s). The combination of R1 and C adds an RC time constant to the circuit model (FIG. 4B).

The parallel combination of a resistor, R2 and constant phase element CPE2 is thought to be the electrical model of the solid polymer electrolyte interface with the interfacial additive of Cell 2 described above and the electrolyte bulk. The combination adds a second RC time constant to the circuit model to the RC model combination.

The series combination of a Warburg impedance component of the cell ($W_{s1}$) is observed with a near 45 degree "straight, diagonal" section of the Nyquist plot—illustrating great ion-diffusion properties of the electrolyte bulk and interfacial regions within the cell.

In this example, the interfacial area(s) between the crystalline silicon based electrode 10 and solid polymer electrolyte 16, which contain the composite interfacial additive layer components 12, 14 of the present application, has a charge transfer resistance, R1, of 19 ohms (9.59 $\Omega/cm^2$), the interfacial area(s) and bulk regions of the solid polymer electrolyte layer 16 has a mass transport resistance, R2, of 65 ohms (32.8 $\Omega/cm^2$); where the R2/R1 illustrate a mass transfer/charge transfer resistance ratio of less than, or equal to, 3.5, and where the capacitance associated with the interfaces between the silicon/solid polymer electrolyte, is 3.38E-7 Faraday (1.70E-7 Faraday/cm$^2$) or less.

Figure 5A:
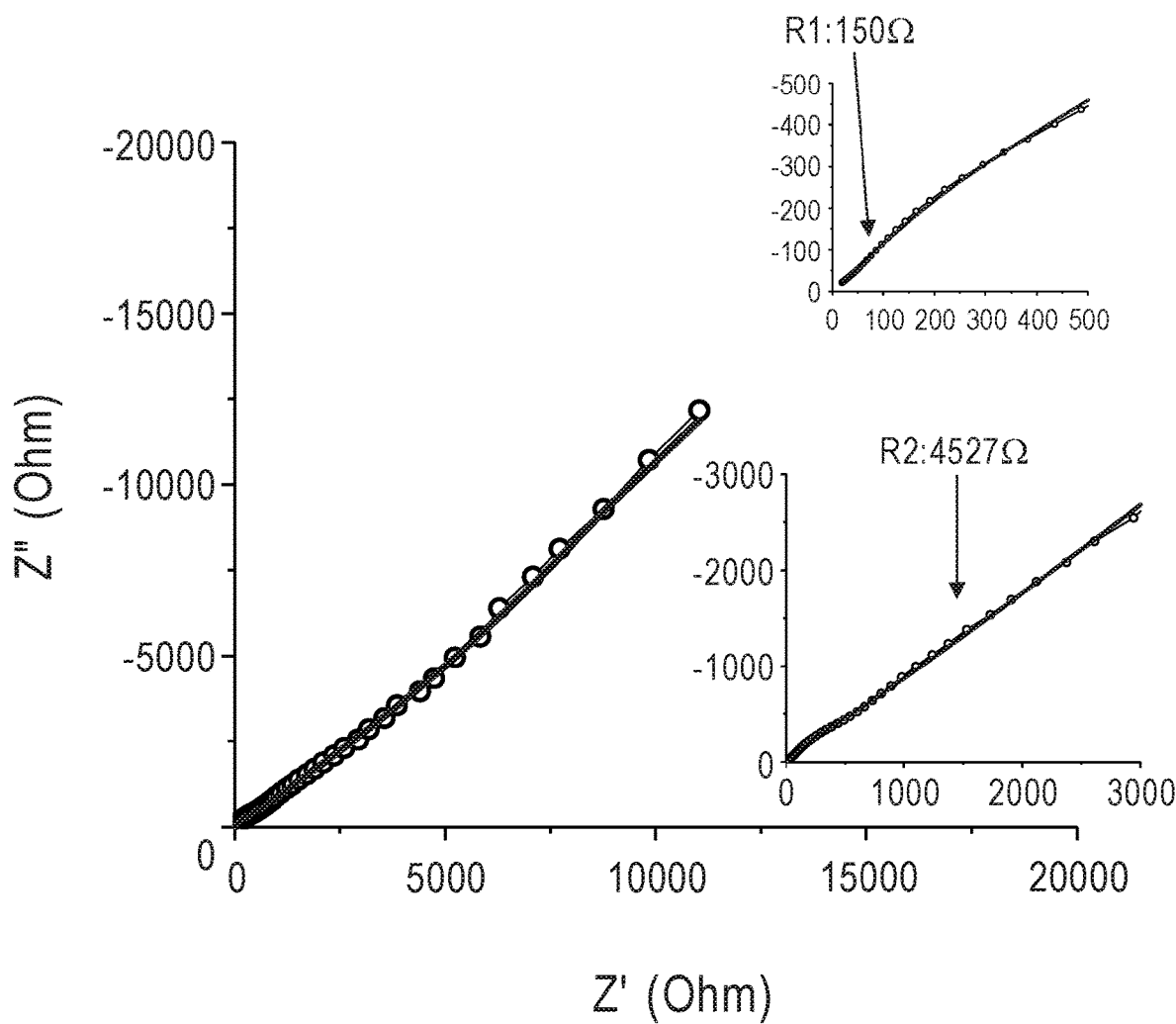
FIG. 5A is graph plotting real part of impedance, Z' in ohms (Ω) vs. imaginary part of impedance, Z" in ohms (Ω) for a device not in accordance with the present application.

The large Nyquist plot in FIG. 5A shows the impedance plots for Cell 1 described above. The "circle" points on each curve are actual measured values at a given frequency and the solid line is the calculated values from a best fit RC model, respectively. The smaller, inset Nyquist Plot in FIG. 5A highlights the high to mid frequency region of the spectrum—illustrating the mass transfer resistance of the cell (4527 Ω; 2286 Ω/cm$^2$) corresponding to the electrolyte bulk and interfacial resistance. The smallest inset Nyquist plot in FIG. 5A illustrates primarily the high frequency region of the spectrum—illustrating the charge transfer resistance of the cell (150 Ω); 75.7 Ω/cm$^2$) corresponding to the silicon bulk and interfacial resistance of the cell.

Figure 5B:
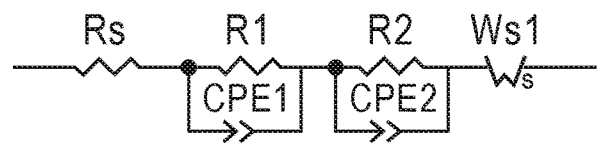
FIG. 5B is the resistor-capacitor model used to fit experimental data and obtain impedance values from the data shown in FIG. 5A.

FIG. 5B is the best fit RC model for the data points for the Cell 1. The model comprises a series or ohmic associated resistance, R$_s$; in series with a parallel combination of a resistor, R1 and constant phase element (CPE) associated impedance—where the first R/CPE parallel element is representative of the silicon/SPE (solid polymer electrolyte) interface; in series a parallel combination of a resistor, R2 and constant phase element (CPE2) associated impedance—where the second R/CPE parallel element is representative of the solid polymer electrolyte interface with the electrolyte bulk; in series with a "Warburg impedance, Ws$_1$.

The frequency measurements varied from 1 megahertz to 200 millihertz; utilizing an applied amplitude of 5 0 mV.

The parallel combination of a resistor, R1 and constant phase element (CPE) is thought to be the electrical model of the active silicon region and associated interface(s). R1 is a pure resistive element while impedance, CPE 1 (CPE, constant phase element) is a combination of both resistive and constant phase associated imaginary component. This parallel combination is attributed to the combined silicon based electrode 10/solid polymer electrolyte (SPE) 16/silicon based electrode 22 interfacial region(s) where the composite interfacial additive layer components 12, 14 of the present application are not present. The combination of R1 and CPE 1 adds an RC time constant to the circuit model (FIG. 5B).

The parallel combination of a resistor, R2 and constant phase element CPE2 is thought to be the electrical model of the solid polymer electrolyte interface with the electrolyte bulk. The combination adds a second RC time constant to the circuit model to the RC model combination.

The series combination of a Warburg impedance component of the cell (W$_{s1}$) is observed with a near 45 degree "straight, diagonal" section of the Nyquist plot—illustrating great ion-diffusion properties of the electrolyte bulk and interfacial regions within the cell.

In this symmetric cell, where the composite interfacial additive layer components 12, 14 of the present application are not present between the silicon based electrodes 22,10 and solid polymer electrolyte 16 layers, the crystalline silicon material and solid polymer electrolyte layer has a charge transfer resistance, R1, of 150 ohms (75.7 Ω/cm$^2$), the interfacial area and bulk regions of the solid polymer electrolyte layer has a mass transport resistance, R2, of 4527 ohms (2286 Ω/cm$^2$); where the R2/R1 illustrate a mass transfer/charge transfer resistance ratio of less than, or equal to, 31, and where the capacitance associated with the silicon/electrolyte interfaces is 1.07E-5 Faraday (5.40E-6 Faraday/cm$^2$).

The differences in the RC models (FIGS. 4B and 5B) which best fit the two symmetric cells, in comparison, illustrate the physio-chemical changes in the interfacial region between the silicon and solid polymer electrolyte layers. The RC model of FIG. 4B contains parallel Resistor-Capacitor (R1/C1) and Resistor-Constant phase element (R2/CPE2) elements in series. The RC model of FIG. 5B contains a Resistor-Constant phase element (R1/CPE1) and Resistor-Constant phase element (R2/CPE2) elements in series. The first parallel element in the RC model changes from Resistor-Capacitor to Resistor-Constant phase element upon eliminating the composite interfacial additive layer components 12, 14 of the present application from the symmetric cell. Hence, the change from constant phase element to capacitor element in the RC model of the symmetric cell illustrated is due to the addition of the composite additive layer components 12, 14 of the present application as an interfacial layer between the silicon and solid polymer electrolyte (SPE) layers. Since CPE elements are often associated with chemical transition layers created upon contact, heating and/or electrochemical activity (e.g. upon applying an electrical current or potential to the cell)—it can be concluded that the CPE1 element (FIG. 5B) which replaces the C1 element (FIG. 4B) is due to an additional interfacial layer which is grown or created when no composite interfacial layer 12, 14 is present. This CPE1 represented interfacial layer is most conclusively the reason for a 131 ohms increase in the resistance to transferring charge across the silicon/SPE interface as well as a 4462 ohms increase in the mass transfer resistance (ion diffusion/ migration resistance) across the solid polymer electrolyte (SPE) bulk and interface regions.

From the above data, it can be observed that by inserting the interfacial composite additive layer 12,14 between the silicon based electrode 10 and the solid polymer electrolyte 16 the following can be obtained: (i) a greater than 7× drop in charge transfer can be obtained across the silicon interface, (ii) a greater than 69× drop in mass transfer resistance can be obtained across the solid polymer electrolyte and electrolyte bulk interface, and (iii) the relative resistance in charge transfer through the entire cell can be improved through the implementation of a pre-implemented composite interfacial layer and consequential beneficial impedance drop of the high resistive interfacial transition layers—as represented by the C1 to CPE1, RC model change of the silicon/solid polymer interface upon the addition of the composite interfacial additive layer components 12, 14 of the present application.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:
1. A device comprising:
a silicon based electrode;
an interfacial additive layer composed of a molten lithium containing salt, wherein the interfacial additive layer has a first surface forming an interface with a surface of the silicon based electrode;
a Li-salt containing conductive polymeric adhesive forming an interface with a second surface of the interfacial additive layer that is opposite the first surface of the interfacial additive layer; and a solid polymer electrolyte layer forming an interface with the Li-salt containing conductive polymeric adhesive.

2. The device of claim 1, wherein the silicon based electrode is selected from the group consisting of non-porous silicon, partially porous crystalline silicon, single-crystal non-porous silicon, crystalline silicon, a low resistance doped crystalline silicon, boron doped crystalline silicon and boron doped crystalline porous silicon, wherein the low resistance doped crystalline silicon is of unitary construction and comprises a non-porous region and a porous region, wherein the porous region comprises a top porous layer having a first thickness and a first porosity, and a bottom porous layer having a second porosity that is greater than the first porosity and a second thickness that is greater than the first thickness.

3. The device of claim 1, wherein the molten lithium containing salt is composed of at least one of lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB).

4. The device of claim 1, wherein the solid polymer electrolyte layer is composed of a polymer structure host material, a Li-conductive/plasticizing material and a lithium containing salt.

5. The device of claim 4, wherein the polymer structure host material is composed of at least one of poly(ethylene oxide) (PEO), poly(propylene oxide) (PPO), poly(dimethylsiloxane), poly(vinyl chloride), or polycaprolactone.

6. The device of claim 4, wherein the Li-conductive/plasticizing material comprises succinonitrile, poly(ethylene glycol) (PEG), an aprotic organic solvent, or any combination thereof.

7. The device of claim 4, wherein the molten lithium containing salt is composed of at least one of lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB).

8. The device of claim 1, wherein the solid polymer electrolyte layer comprises a lower region and an upper region, and wherein a separator is present between the lower region and the upper region.

9. The device of claim 8, wherein the separator is composed of at least one of polyacrylnitrile (PAN), polyethylene oxide (PEO) based copolymer matrices or structural membranes, a quarternized polysulfone membrane, electrospun polyvinylidene fluoride, or a methylmethacrylate (MMA)/polyethylene (PE) composite.

10. The device of claim 1, wherein the Li-salt containing conductive polymeric adhesive is composed of a polypyrrol (Ppy), polythiophene, polyaniline (PANI), polyphenylene sulfide, Ppy/carbon nanotube composites, poly(3-(potassium-4-butanoate) thiophene) (PPBT) and poly(ethylene glycol) (PEG) composites, and polystyrene sulfonate and carbon composites.

11. The device of claim 1, wherein the Li-salt containing conductive polymeric adhesive further comprises a lithium containing salt composed of at least one of lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB).

12. The device of claim 1, further comprising a counter electrode located above the solid polymer electrolyte layer.

13. The device of claim 12, wherein the counter electrode is a second silicon based electrode, and wherein a second Li-salt containing conductive polymeric adhesive and a second interfacial additive layer composed of another molten lithium containing salt are present directly between the solid polymer electrolyte layer, and the second silicon based electrode, wherein the second Li-salt containing conductive adhesive forms a first interface with the solid polymer electrolyte layer and the second Li-salt containing conductive polymeric adhesive forms a second interface with the second interfacial additive layer, and the second interfacial additive layer forms an interface with the counter electrode.

14. The device of claim 12, wherein the second Li-salt containing conductive polymeric adhesive is composed of a polypyrrol (Ppy), polythiophene, polyaniline (PANI), polyphenylene sulfide, Ppy/carbon nanotube composites, poly(3-(potassium-4-butanoate) thiophene) (PPBT) and poly(ethylene glycol) (PEG) composites, and poly polystyrene sulfonate and carbon composites, and the second molten lithium containing salt is composed of at least one of lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB).

15. The device of claim 1, wherein an interfacial area between the silicon based electrode and a composite composed of the interfacial additive layer and the Li-salt containing polymeric adhesive has a charge resistance of less than 10 ohms/cm$^2$, the interfacial area and bulk regions of the solid polymer electrolyte layer has a mass transport resistance of less than 33 ohm/cm$^2$, and wherein a mass transfer/charge transfer resistance ratio is less than, or equal to, 3.5.

16. A device comprising:
  a silicon based electrode composed of boron doped crystalline silicon;
  an interfacial additive layer composed of molten lithium bis(trifluoromethanesulfonyl)imide (LiTFSI), wherein the interfacial additive layer has a first surface forming an interface with a surface of the silicon based electrode;
  a Li-salt containing conductive polymeric adhesive composed of a mixture of polyaniline (PANI) and LiTFSI forming an interface with a second surface of the interfacial additive layer that is opposite the first surface of the interfacial additive layer; and
  a solid polymer electrolyte layer composed of a mixture of polycaprolactone, succinonitrile and LiTFSI forming an interface with the Li-salt containing conductive polymeric adhesive.

17. The device of claim 16, further comprising a second Li-salt containing conductive polymeric adhesive composed of a mixture of polyaniline and LiTFSI forming an interface with the solid polymer electrolyte layer, a second interfacial additive layer composed of molten LiTFSI forming an interface with the second Li-salt containing conductive polymeric adhesive, and a second silicon based electrode composed of boron doped crystalline silicon forming an interface with the second interfacial additive layer.

18. A method of forming a device, the method comprising:
- depositing a layer of a lithium containing salt on a surface of a silicon based electrode;
- heating the layer of the lithium containing salt to a temperature that provides a molten lithium containing salt;
- cooling the molten lithium containing salt to provide an interfacial additive layer composed of the molten lithium containing salt;
- forming a Li-salt containing conductive polymeric adhesive on the interfacial additive layer; and
- forming a solid polymer electrolyte layer on the Li-salt containing conductive polymeric adhesive.

19. The method of claim 18, wherein the heating is performed at a temperature above 400° C. and in an inert ambient.

20. The method of claim 18, further comprising forming a counter electrode above the solid polymer electrolyte layer.

* * * * *